US012619511B2

(12) United States Patent
Fernandez Orellana et al.

(10) Patent No.: US 12,619,511 B2
(45) Date of Patent: May 5, 2026

(54) METHOD, DEVICE, AND PRODUCT FOR DETERMINING FLUID DYNAMICS FOR SERVER

(71) Applicant: Dell Products L.P., Round Rock, TX (US)

(72) Inventors: Pedro Fernandez Orellana, Surfers Paradise (AU); Qiang Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 18/665,007

(22) Filed: May 15, 2024

(65) Prior Publication Data
US 2025/0328443 A1      Oct. 23, 2025

(30) Foreign Application Priority Data
Apr. 23, 2024      (CN) .......................... 202410494204.9

(51) Int. Cl.
*G06F 1/24*          (2006.01)
*G06F 9/4401*       (2018.01)
*G06F 11/30*        (2006.01)

(52) U.S. Cl.
CPC ........ *G06F 11/3058* (2013.01); *G06F 9/4401* (2013.01); *G06F 11/3051* (2013.01); *G06F 9/4411* (2013.01)

(58) Field of Classification Search
CPC . G06F 11/3058; G06F 9/4401; G06F 11/3051
USPC .......................................................... 713/100
See application file for complete search history.

(56) References Cited

U.S. PATENT DOCUMENTS

| | | | | |
|---|---|---|---|---|
| 11,190,918 B1 * | 11/2021 | Lingle | ................... | H02J 50/001 |
| 11,381,468 B1 * | 7/2022 | Thompson | ............ | H04L 67/101 |
| 2008/0167848 A1 * | 7/2008 | Artman | ................... | G06Q 10/06 |
| | | | | 703/9 |
| 2008/0174954 A1 * | 7/2008 | VanGilder | .......... | H05K 7/20745 |
| | | | | 361/679.54 |

(Continued)

OTHER PUBLICATIONS

Wikipedia, "Halton Sequence," https://en.wikipedia.org/wiki/Halton_sequence, Aug. 13, 2023, 3 pages.

(Continued)

*Primary Examiner* — Volvick Derose
(74) *Attorney, Agent, or Firm* — Ryan, Mason & Lewis, LLP

(57) ABSTRACT
Embodiments of the present disclosure provide a method, an electronic device, and a computer program product for determining computational fluid dynamics (CFD) for a server. The method includes determining, by a trained machine learning model, benchmark CFD for a benchmark server. The method further includes determining a difference between a target server configuration for a target server and a benchmark server configuration for the benchmark server, and determining, by the trained machine learning model, target CFD for the target server based on the difference and the benchmark CFD. Embodiments of the present disclosure can realize real-time thermal simulations and enable real-time thermal models with specific server configurations to be adapted to servers with different components.

20 Claims, 11 Drawing Sheets

(56)                    References Cited

U.S. PATENT DOCUMENTS

| | | | |
|---|---|---|---|
| 2012/0311370 A1* | 12/2012 | Dasgupta ................ | G06F 30/00 |
| | | | 713/340 |
| 2013/0046514 A1* | 2/2013 | Shrivastava ............ | G06F 30/18 |
| | | | 703/1 |
| 2014/0297231 A1* | 10/2014 | Georgescu ............. | G06F 30/28 |
| | | | 703/2 |
| 2015/0363515 A1* | 12/2015 | Singh ...................... | G06F 30/13 |
| | | | 703/1 |
| 2017/0261949 A1* | 9/2017 | Hoffmann ................ | G06N 7/01 |
| 2022/0007549 A1* | 1/2022 | Lu ........................... | G06F 1/206 |
| 2023/0185608 A1* | 6/2023 | Poort ................. | H04L 41/5009 |
| | | | 709/224 |
| 2023/0351065 A1* | 11/2023 | Keramati ................ | G06F 30/28 |
| 2025/0216824 A1* | 7/2025 | Ali ......................... | G05B 13/04 |

OTHER PUBLICATIONS

D. Kochkov et al., "Machine Learning Accelerated Computational Fluid Dynamics," arXiv:2102.01010v1, Jan. 28, 2021, 13 pages.
X. Han et al., "Predicting Physics in Mesh-reduced Space with Temporal Attention," arXiv:2201.09113v4, May 26, 2022, 22 pages.
S. L. Brunton et al., "Machine Learning for Partial Differential Equations," arXiv:2303.17078v1, Mar. 30, 2023, 16 pages.
Ansys, Inc., "Ansys Fluent," https://www.ansys.com/content/dam/product/fluids/fluent/ansys-fluent-brochure-140.pdf, Oct. 2020, 8 pages.
Wikipedia, "Computational Fluid Dynamics," https://en.wikipedia.org/wiki/Computational_fluid_dynamics, Apr. 21, 2024, 19 pages.

* cited by examiner

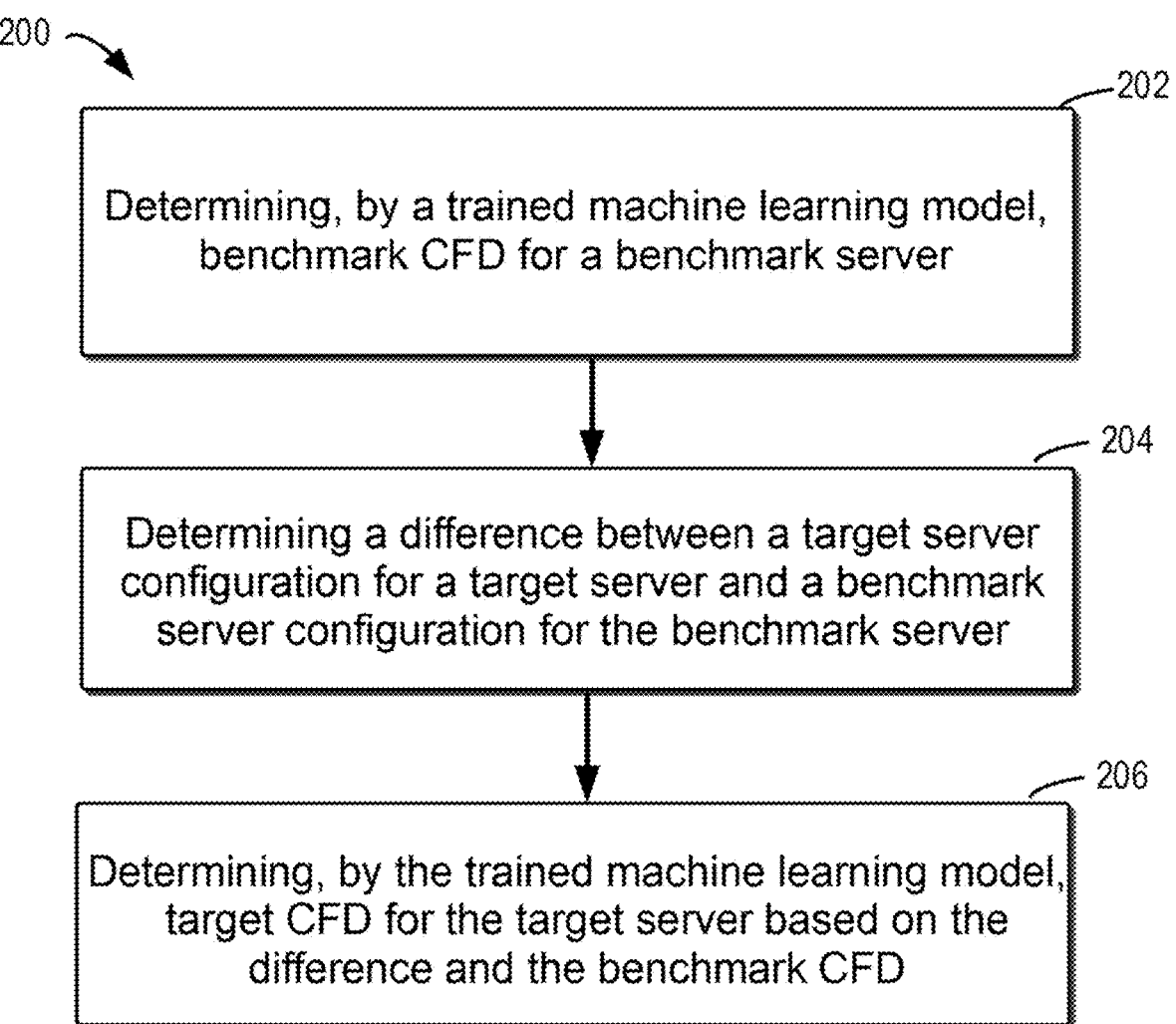

200

Determining, by a trained machine learning model, benchmark CFD for a benchmark server

202

Determining a difference between a target server configuration for a target server and a benchmark server configuration for the benchmark server

204

Determining, by the trained machine learning model, target CFD for the target server based on the difference and the benchmark CFD

Classification of Components Constructed Relative to the Benchmark

604
Geometrically Similar or Irrelevant

606
Geometrically Absent

608
Improving Training Data Points

610
Geometric Placeholders

900

Heat generated in Watts per hour (W/h)

Percentage of Workload

METHOD, DEVICE, AND PRODUCT FOR DETERMINING FLUID DYNAMICS FOR SERVER

RELATED APPLICATION

The present application claims priority to Chinese Patent Application No. 202410494204.9, filed Apr. 23, 2024, and entitled "Method, Device, and Product for Determining Fluid Dynamics for Server," which is incorporated by reference herein in its entirety.

FIELD

Embodiments of the present disclosure relate to the field of computers and, more particularly, to a method, an electronic device, and a computer program product for determining fluid dynamics for a server.

BACKGROUND

As the performance of certain types of electronic devices, especially servers, which may be implemented in the form of high-performance computers and/or other related electronic devices, is continuously improved, the amount of heat they generate also increases, and effective thermal management solutions are thus needed to ensure stable operation and extended service life of such servers. Thermal emulation or thermal simulation is a function widely used in engineering and designing servers.

It is critical to know the thermal distribution of a server chassis with different components and configurations to ensure the overall reliability and efficiency of the server. By means of thermal emulation, it is possible to consider heat dissipation schemes at an early design stage, so as to select the appropriate heat dissipation techniques and to design better heat dissipation structures, such as heat sinks, fan layouts, or coolant passages, thus reducing costs and development time.

SUMMARY

Embodiments of the present disclosure provide a method, an electronic device, and a computer program product for determining computational fluid dynamics (CFD) for a server.

According to a first aspect of the present disclosure, a method for determining CFD for a server is provided. The method includes determining, by a trained machine learning model, benchmark CFD for a benchmark server. The method further includes determining a difference between a target server configuration for a target server and a benchmark server configuration for the benchmark server, and determining, by the trained machine learning model, target CFD for the target server based on the difference and the benchmark CFD.

According to a second aspect of the present disclosure, an electronic device for determining CFD for a server is provided. The device includes at least one processor, and a memory coupled to the at least one processor and having instructions stored therein, wherein the instructions, when executed by the at least one processor, cause the electronic device to perform actions including: determining, by a trained machine learning model, benchmark CFD for a benchmark server. The actions further include determining a difference between a target server configuration for a target server and a benchmark server configuration for the benchmark server, and determining, by the trained machine learning model, target CFD for the target server based on the difference and the benchmark CFD.

According to a third aspect of the present disclosure, a computer program product is provided. The computer program product is tangibly stored on a non-transitory computer-readable medium and includes machine-executable instructions, wherein the machine-executable instructions, when executed by a machine, cause the machine to perform actions including: determining, by a trained machine learning model, benchmark CFD for a benchmark server. The actions further include determining a difference between a target server configuration for a target server and a benchmark server configuration for the benchmark server, and determining, by the trained machine learning model, target CFD for the target server based on the difference and the benchmark CFD.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements, and in which:

FIG. 2 is a flowchart for determining CFD for a server;

DETAILED DESCRIPTION

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments disclosed herein.

Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Performing thermal emulation or thermal simulation of a server is a computationally intensive task, which is generally not performed in accordance with a real-time model, and performing a single simulation can take up to several hours, which makes it costly in terms of time and labor.

At least to address the above and other potential problems, embodiments of the present disclosure provide a method for determining CFD for a server. The method includes determining, by a trained machine learning model, benchmark CFD for a benchmark server. The method further includes determining a difference between a target server configuration for a target server and a benchmark server configuration for the benchmark server, and determining, by the trained machine learning model, target CFD for the target server based on the difference and the benchmark CFD. The method implemented by the present disclosure enables real-time thermal simulations and enables real-time thermal models with specific server configurations to be adapted to servers with different components.

Figure 1A:
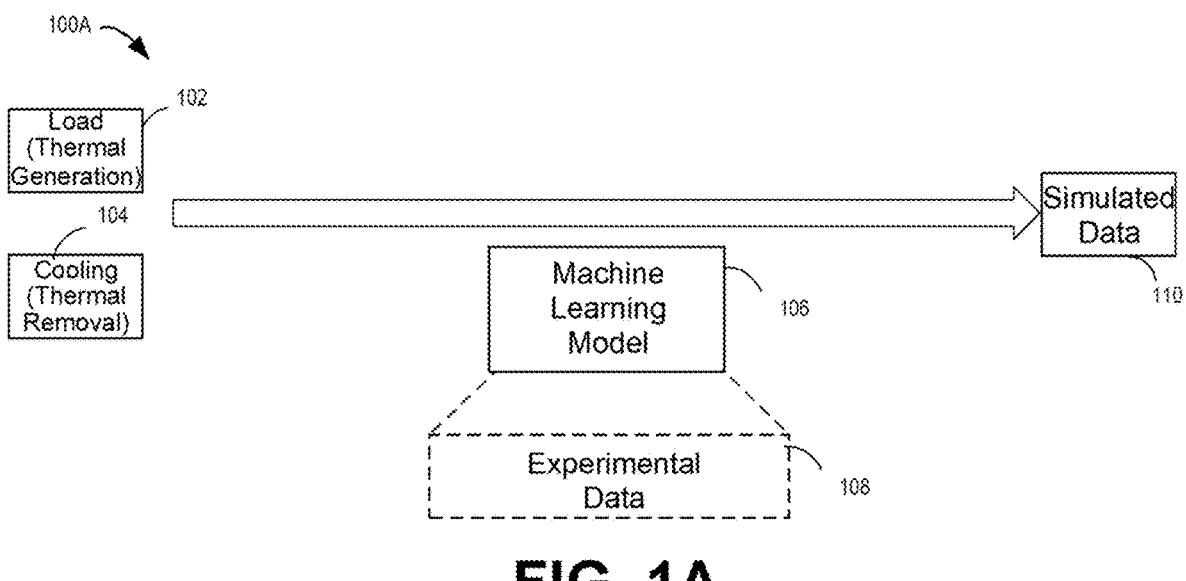
FIG. 1A is a schematic diagram of an environment in which embodiments of the present disclosure can be implemented.

FIG. 1A is a schematic diagram of an environment 100A in which embodiments of the present disclosure can be implemented. As shown in FIG. 1A, workload parameters 102 for heat generated by a server during operation and cooling parameters 104 along with experimental data 108 (e.g., temperature, flow rate, and pressure data collected during the actual operation of the server) may be fed into a machine learning model 106 for simulating the CFD for the server, and finally simulated data 110 (such as the temperature, the air rate, the pressure, or the like) for thermal simulation associated with the server may be generated.

In embodiments of the present disclosure, the workload parameters 102 may be, for example, heat generated by different hardware components. The cooling parameters 104 may be data of, for example, fans, heat sinks, or liquid cooling systems. The experimental data 108 may be temperature, flow rate, and pressure data collected during the actual operation of the server, which may be used to train and validate the machine learning model 106 so as to ensure that the model predictions match the actual situation.

Figure 1B:
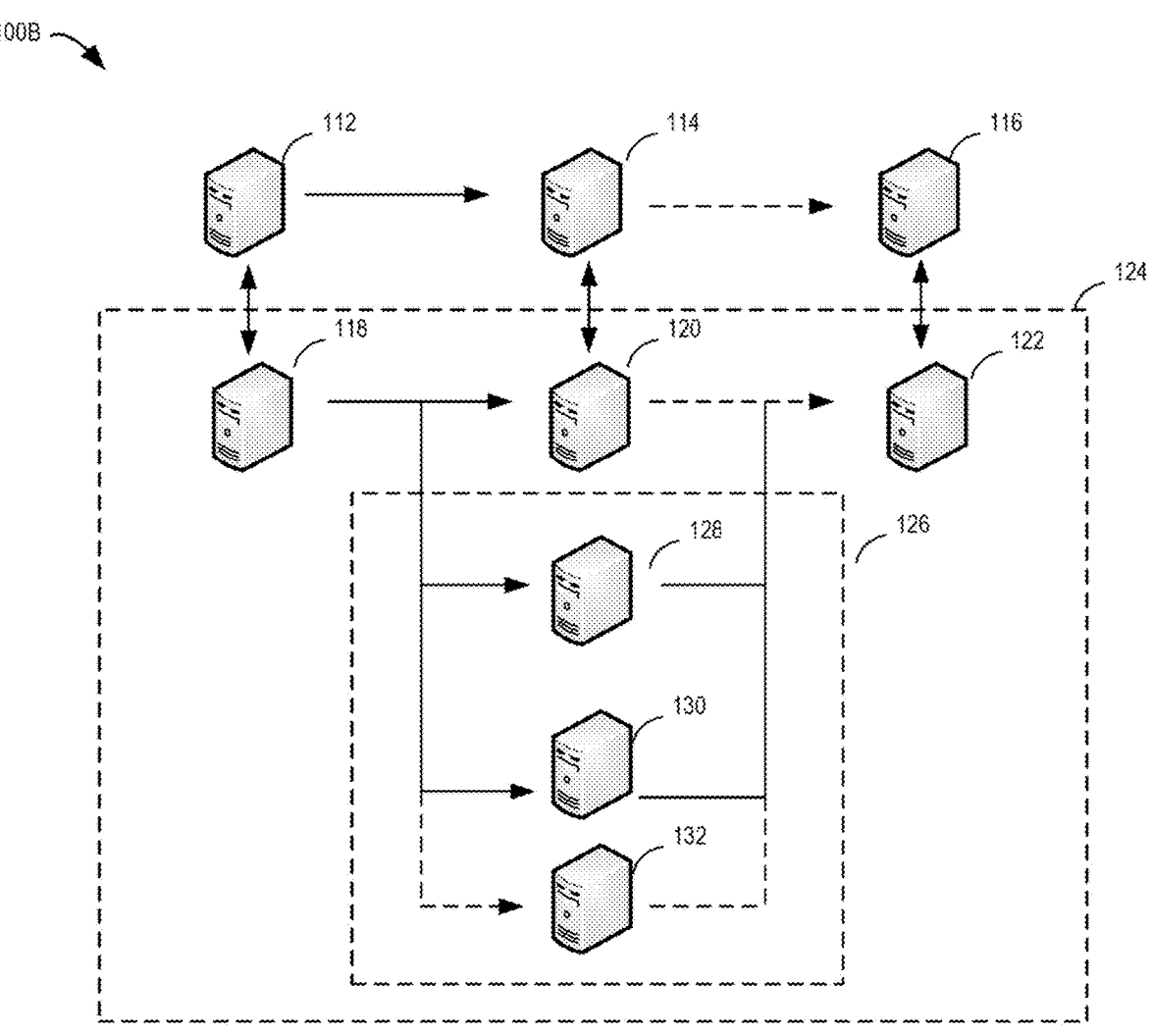
FIG. 1B is a schematic diagram of another environment in which embodiments of the present disclosure can be implemented.

FIG. 1B is a schematic diagram of another environment 100B in which embodiments of the present disclosure can be implemented. As shown in FIG. 1B, servers 112, 114, and 116 therein may represent, for example, the state of a physical IT system, such as a server, in which the thermal distribution changes over time at different time points (such as T0, T1, . . . , and Tn).

Block 124 may be a numerically-represented IT system that corresponds to the physical IT system. For example, block 124 comprises virtual servers 118, 120, and 122 that are implemented as respective virtual models, also referred to herein as digital twin models, of the physical IT system at different moments in time. The digital twin models of the virtual servers 118, 120, and 122 are capable of simulating hypothetical scenarios input by an engineer, thereby enabling thermal simulation 126, for example, testing various hypothetical conditions in a virtual environment so as to observe how the thermal distribution of the server system is affected. In some embodiments, at the hypothetical condition 128, the hardware configuration of the server may be changed; at the hypothetical condition 130, the heat dissipation system of the server may be adjusted; or at the hypothetical condition 132, the operating conditions of the server may be modified, or the like.

In this way, it is possible to observe how different configuration variables affect the thermal performance of the system, thus enabling the evaluation and optimization of the thermal behavior of several different hardware configurations in the digital domain, without the need to physically design each configuration. According to embodiments of the present disclosure, examples of the server may include, but are not limited to, a database server, a rack server, a server cluster, a blade server, an enterprise server, an application server, or the like, and the present disclosure does not impose any limitations thereon.

FIG. 2 is a flowchart of a method 200 for determining CFD for a server. As shown in FIG. 2, at block 202, benchmark CFD for a benchmark server is determined by a trained machine learning model. The machine learning model according to the present disclosure may be, for example, a machine learning model or a deep learning model. In some embodiments, the benchmark server may be a representative server with a particular hardware configuration, for example, a server with the most elements or the highest load. The CFD simulation result of the benchmark server may be used as a reference for simulation of other server configurations.

In some embodiments, the benchmark server configuration may include component information associated with the benchmark server, and data such as user-defined geometry and component preferences. The machine learning model can quickly predict the thermal behavior or CFD of the benchmark server by learning a large number of similar CFD simulation results.

For example, in some embodiments, load data and cooling data associated with operation of the benchmark server can be collected, and the machine learning model can be trained based on these data and a user predetermined condition. The machine learning model may have a normalization layer and may be adjusted based on the server configuration.

At block 204, a difference between a target server configuration for a target server and a benchmark server configuration for the benchmark server is determined. According to embodiments of the present disclosure, the target server may be an object server to be specifically evaluated or optimized or a server to be upgraded, adjusted, and tested.

For example, in some embodiments, the two may be compared with respect to variations in the number, the types, and the layout of the hardware components (such as CPUs, memory, storage devices, and the like), as well as any other factors that may affect the internal airflow and thermal management of the server. These differences can be used to adjust the simulation of the benchmark CFD to reflect the actual operating environment of the target server. In some embodiments, the two may also be compared with respect to the geometric similarity of the components so as to classify the components of the two as geometrically similar components or geometrically absent components, among other ways. Specific methods regarding the classification will be described with reference to the following accompanying figures.

At block 206, target CFD for the target server is determined by the trained machine learning model based on the difference and the benchmark CFD. The machine learning model may generate thermal and fluid flow simulations for the target server based on the information it learns from the benchmark simulation and the specific differences between the two server configurations. For example, the machine learning model may scale the benchmark CFD based on the geometrically similar components, so as to determine the target CFD for the target server. In some embodiments, the machine learning model may also ignore heat generated by the geometrically absent components.

Figure 3:
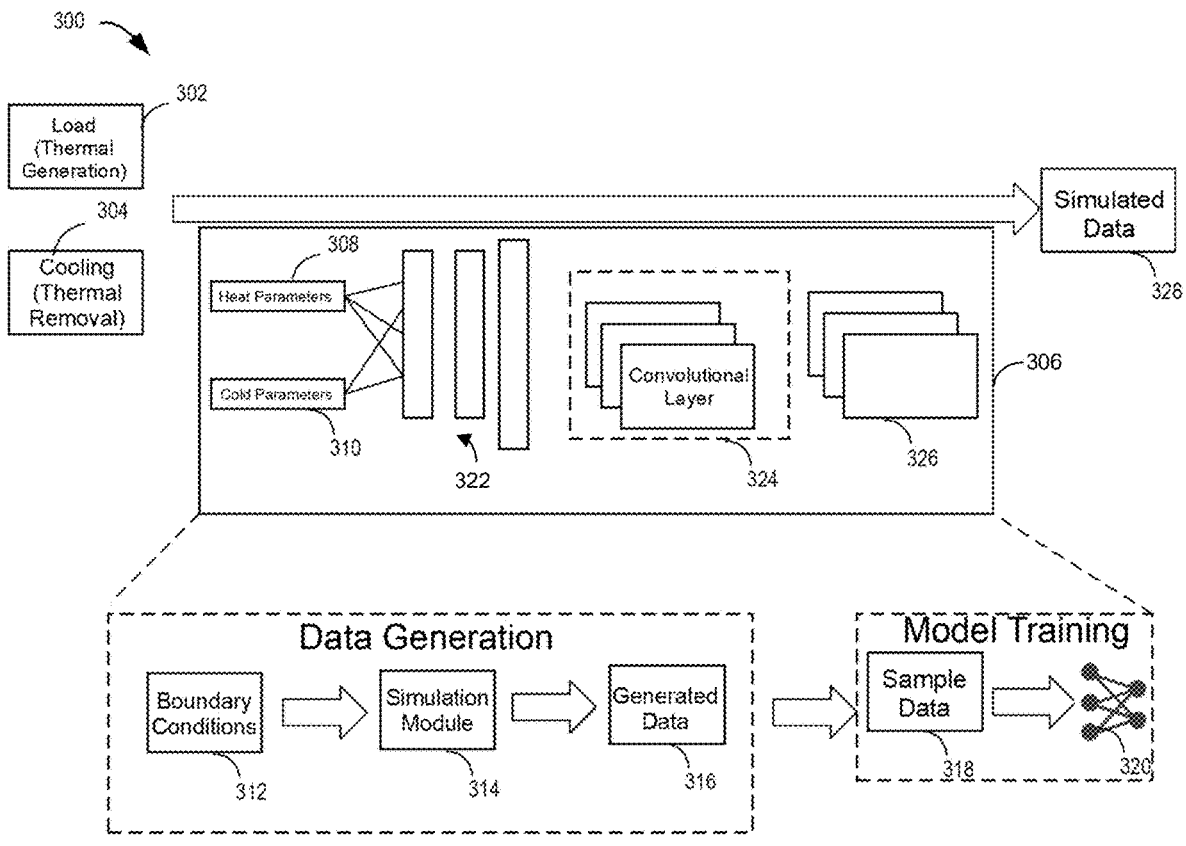
FIG. 3 is a schematic diagram of a process for training a machine learning model according to an embodiment of the present disclosure.

FIG. 3 is a schematic diagram of a process 300 for training a machine learning model according to an embodiment of the present disclosure. According to embodiments of the present disclosure, various data associated with the server, such as load data (heat generation data) 302 in a server chassis, may be collected as heat parameters 308. In some embodiments, the load data 302 may include data of various heat sources such as central processing units (CPUs), random access memory (RAM), hard disk drives (HDDs), and the like. In some embodiments, cooling data (heat removal data) 304 in the server chassis may also be collected as cold parameters 310. It may include various data such as the fan speed, the size of the air intake of the server, and so on.

These data may be fed into a deep learning and CFD thermal emulation based agent model or machine learning model 306 for CFD simulation, which is implemented based on the present disclosure. In some embodiments, the machine learning model 306 may set boundary conditions 312 for simulating the hot and cold exchanges of the server, so as to simulate physical conditions at the regional edges of the server, for example, conditions such as the temperature, the pressure, the speed, and so forth. These conditions can simulate conditions that will be encountered by fluids in the server in the real-world environment.

In some embodiments, the boundary conditions 312 may include temperature boundary conditions, such as an initial temperature of a component of the server, an operating temperature, or the temperature of an external cooling medium. In some embodiments, the boundary for the highest operating temperature of the processor of the server may be set, and the boundary for an inlet temperature of, for example, an air or liquid cooling medium may be set. In some embodiments, the boundary conditions may include factors such as the size, the position, and the distribution of internal server component heat sources such as CPUs, GPUs, memory, and power supply units.

In some embodiments, the boundary conditions 312 may also include the type of the server cooling system, such as fan cooling, liquid cooling, or phase-change cooling, as well as related parameters such as the fan speed, the airflow rate, the flow rate of a coolant, and a cooling path. In some embodiments, the boundary conditions may also include fluid flow boundary conditions, for example, the pressures and velocities at the air intake and exhaust ports.

For example, in an environment where the cooling system of the server is a forced air cooling system, the boundary conditions 312 may include characteristics of airflow generated by the fan. In an environment where the cooling system of the server is a liquid cooling system, the boundary conditions may include factors such as performance characteristics of the cooling pump. Additionally or alternatively, in some embodiments, the boundary conditions may also include external physical factors, for example, factors such as the dimensions and construction of the cabinet of the server.

The subsequently collected data and boundary conditions 312 may be fed into a simulation module 314 of the machine learning model 306 for simulating fluid flow and heat transfer processes. In some embodiments, the simulation module 314 may create a computational domain and apply the boundary conditions 312 to that computational domain. The simulation module 314 may then run simulations to predict, for example, behaviors such as fluid flow, temperature distributions, and pressure fields in the server. A simulated result comprising generated data 316 may take the form of a dataset to describe the physical quantities between various elements or components within the entire server.

In some embodiments, the simulated result comprising generated data 316 may be used as training sample data 318 and then fed to a deep learning model 320 in the machine learning model 306, thus enabling the deep learning model 320 to learn and predict fluid behavior in the server chassis under similar conditions. As an example, the deep learning model 320 may be a learning model based on a convolutional neural network. According to embodiments of the present disclosure, the deep learning model 320 may include a sampling layer 322 that may sample the collected data.

The deep learning model 320 may also include a convolutional layer 324, which may extract features of the input sample data through a convolutional operation. For example, in some examples, a convolutional kernel (or filter) in the convolutional layer 324 may be slid over the input data to calculate the dot product of the convolutional kernel and the data to produce feature maps. Each convolutional kernel may extract specific features. Each feature map of the feature maps may represent the activation situation of a particular feature in the input data.

In some embodiments, the extracted feature maps may be fed into a fully connected layer 326 in the deep learning model 320 for performing classification or other tasks based on the features extracted by the previous layers and outputting a final decision of the deep learning model 320. Additionally or alternatively, in some embodiments, the deep learning model 320 may also be other types of machine learning models, such as, for example, a multilayer perceptron (MLP), a decision tree, a generative adversarial network (GAN), a variational autoencoder (VAE), and so forth, and the present disclosure does not impose any limitations thereon. In this way, through the data generation and model training processes described above, simulated data for conditions such as the temperature, the wind speed, and the pressure for each of the three-dimensional points of the server chassis can be simulated and predicted at block 328.

Figure 4:
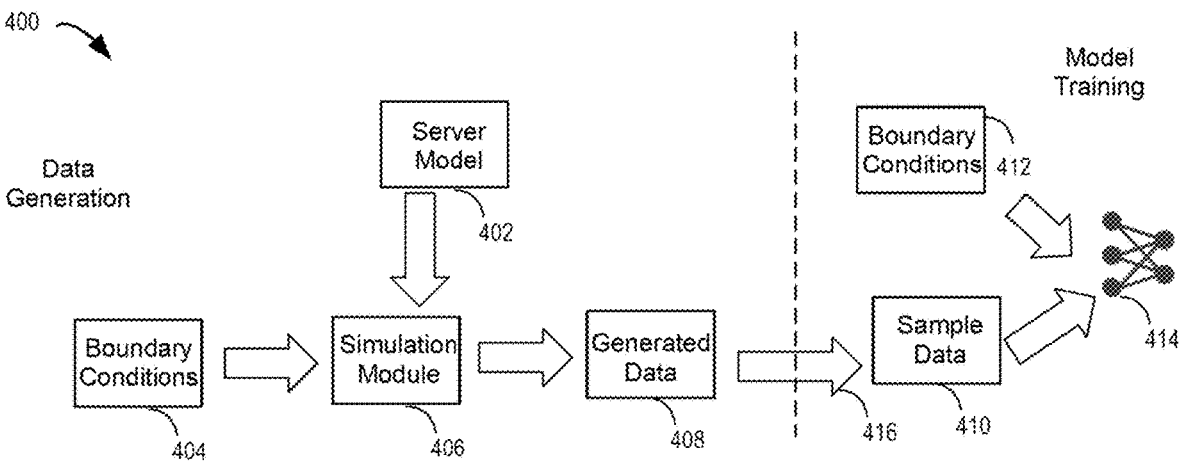
FIG. 4 is a schematic diagram of another process for training a deep learning model in a machine learning model according to an embodiment of the present disclosure.

FIG. 4 is a schematic diagram of another process 400 for training a deep learning model in a machine learning model according to an embodiment of the present disclosure. As shown in FIG. 4, boundary conditions 404 for a given server model 402 may first be determined. In some embodiments, the boundary conditions 404 may be set based on a low-difference Halton sequence. According to embodiments of the present disclosure, because the Halton sequence uses different prime bases in the generation process, the Halton sequence can generate point sets uniformly in the multi-dimensional space, which allows for better coverage of the multi-dimensional space.

The input data such as the cooling parameters and the heat parameters along with the boundary conditions 404 can then be input as a combined set of inputs into a CFD simulator 406, also referred to as a simulation module, according to an embodiment of the present disclosure for simulation, and simulated data 408 can be generated. The simulated data 408 is also referred to as generated data. According to embodiments of the present disclosure, the CFD simulator 406 may simulate a server chassis with standard configuration.

Each element in the CFD simulator 406 may simulate or represent an element in the actual server chassis. For example, the CFD simulator 406 may simulate the processor, the memory sticks, and the hard disk of the server, or parts of the cooling system, such as fans or radiators. In some embodiments, the CFD simulator may simulate a three-dimensional model of the server chassis, including the positions and the sizes of all components within the chassis, as well as the shape and the size of the chassis housing, among other factors, so that air flow paths and heat transfer mechanisms within the server chassis can be simulated.

In some embodiments, the CFD simulator 406 may simulate thermal loads such as those generated by the processor, thereby enabling simulation of the distribution of heat within the server chassis. In some embodiments, the CFD simulator 406 may also simulate the operating characteristics of various elements of the cooling system, for example, the airflow speed and direction of the fans and the flow rate of the coolant, thereby enabling an accurate reflection of the actual cooling effect. In some embodiments, the CFD simulator 406 may also simulate the air flow and heat transfer processes, for example, processes such as the flow of air between elements and/or components of the server, how heat is transferred from the heat source to the air, and how it is carried away through the cooling system.

Additionally or alternatively, in some embodiments, the CFD simulator 406 may also simulate the external deployment situation of the server, for example, the temperature around the chassis, the pressure difference between inside and outside the chassis, airflow patterns and temperature distribution inside the data center, among other factors. In this way, the CFD simulation setting for a standard server configuration can be achieved. By using the predetermined models and methods without having to build a simulation environment from scratch, a significant amount of preparation time can be saved, thus increasing the efficiency of the overall simulation process.

In some embodiments, the simulated data 408 generated by the CFD simulator 406 may be uneven, which may lead to problems when performing comparison and analysis between simulation results. Thus, the simulated data 408 may be sampled or interpolated 416 to generate an even sample dataset 410, which may allow the sample dataset 410 to have the same spatial discrimination. In some embodiments, interpolation may also fill in data gaps that are present, for example, simulation blind spots caused during simulation calculations performed by the CFD simulator 406.

The sampled or interpolated sample dataset 410 may be used in combination with the boundary conditions 412 as an input training dataset to train the deep learning model 414 for the server, such that the deep learning model 414 may be capable of learning and predicting the thermal performance of the system under a given boundary condition. In some embodiments, preprocessing operations such as normalization and denoising may be performed on the input training dataset, such that the efficiency of the training of the deep learning model 414 can be improved.

According to embodiments of the present disclosure, the deep learning model 414 may be trained repeatedly and iteratively, thereby reducing the difference between model predictions and actual results. In some embodiments, model parameters of the deep learning model 414 may be adjusted by back propagation based on a loss function.

Figure 5:
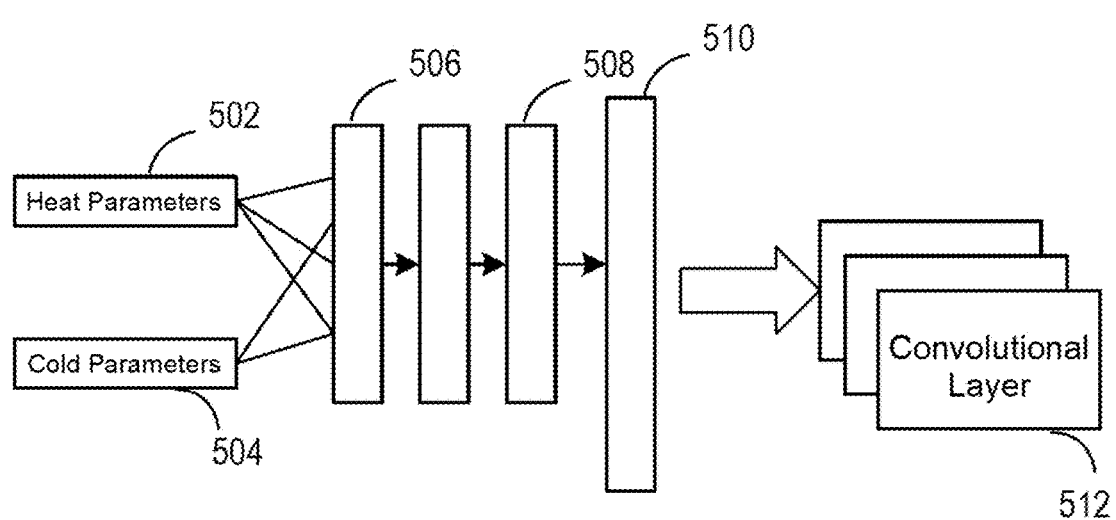
FIG. 5 is an architectural diagram of a deep learning model for real-time thermal simulation according to an embodiment of the present disclosure.

FIG. 5 is an architectural diagram of a deep learning model 500 for real-time thermal simulation according to an embodiment of the present disclosure. As shown in FIG. 5, an input layer 506 in the deep learning model 500 may accept two types of inputs, such as heating parameters 502 and cooling parameters 504 from a server. The heating parameters 502 and the cooling parameters 504 may simulate data about thermal dynamic characteristics of the server chassis in the real-world environment, such as components such as heat sources (e.g., CPU and GPU workloads) and cooling mechanisms (e.g., fan speeds and cooling piping) in the operation of the server. As an example, the input layer 506 may have 128 or more neurons.

According to some embodiments of the present disclosure, the deep learning model 500 may be a multi-layer perceptron (MLP)-based model, which may be composed of a plurality of layers, with each layer consisting of a plurality of nodes or neurons, each neuron being connectable to all the neurons in the next layer. In the context of the present disclosure, the MLP can be used to deal with field-based methods and thus can address problems of thermal simulation.

In embodiments of the present disclosure, a hyperbolic tangent (Tanh) function may be used as an activation function in the deep learning model 500. The Tanh function, which has an output range of [−1, 1], can centralize the output, thus contributing to mitigate gradient vanishing in deep networks. The Tanh activation function can be applied on the output of each neuron, which introduces the necessary nonlinearity to the deep learning model 500, thus enabling the model to solve complex problems.

The deep learning model 500 may have a plurality of hidden layers or linear (dense) layers 508, which can extract nonlinear relationships and patterns in the input data. As an example, the number of neurons it may have is 256. As the number of neurons increases, the expressive power of the deep learning model 500 increases, so that more combinations of features can be learned.

According to embodiments of the present disclosure, a normalization layer (LayerNorm) may also be added between the hidden layers 508 for use in normalizing the input. The normalization layer can improve the stability and performance of the training by calculating the mean and variance of the input features and then normalizing those features. According to an embodiment of the present disclosure, the normalization layer outperforms other normalization methods in experiments because it maintains the independence of the distribution of the inputs of each layer during the normalization process.

According to an embodiment of the present disclosure, the output layer 510 of the deep learning model 500 may have 600,000 output neurons that can predict a large number of independent variables. The output layer 510 may combine all of the features learned by the previous layers and map them to a prediction space. The outputs of the deep learning model 500 may be organized into a specific multi-dimensional structure so as to correspond to the temperature field or other physical quantities inside the server chassis, thus reflecting the pattern of thermal distribution within the server chassis. In some embodiments, the deep learning model 500 may include no convolutional neural layer, thereby saving computational costs.

In some embodiments, the deep learning model 500 may continuously adjust its weights and biases by using the training data. For example, the value of the loss function, e.g., the mean square error or the cross entropy, may be calculated by means of a loss calculation that compares the predicted values of the model with the actual values. In some embodiments, the gradient of the loss relative to each weight can also be calculated, and these gradients can then be passed back to the network to adjust the weights and reduce the prediction error, thereby minimizing the loss function. Ultimately, these data can be fed into a fully connected layer 512 for use in classification or other tasks based on features extracted by the previous layers, and a final decision can be output.

Table 1 below illustrates a statistical table of the prediction accuracy of a computational model according to embodiments of the present disclosure, which is used for simulation or for prediction results of the machine learning algorithm.

TABLE 1

|     | MSE(%)   | MAE(%)   | Emax(%)  | Emin(%)     |
| --- | -------- | -------- | -------- | ----------- |
| vx  | 0.066321 | 0.029971 | 0.256505 | −0.242942   |
| vy  | 0.057094 | 0.023185 | 0.269970 | −0.242690   |
| vz  | 0.122999 | 0.082027 | 0.525078 | −0.396604   |
| t   | 1.296904 | 1.022907 | 2.568762 | −11.449184  |
| p   | 1.296904 | 0.130319 | 0.717244 | −0.184771   | where MSE or mean squared error denotes the mean value of the squares of errors, i.e., the mean value of the squares of the differences between the estimated values and the actual values. MAE denotes the mean absolute error, i.e., the mean value of the absolute values of the differences between the estimated values and the actual values. Emax denotes the maximum error, i.e., the maximum percentage error in the prediction. Emin denotes the minimum error, i.e., the case where the predicted value is closest to the actual value. The values vx, vy, and vz denote the gas velocity components in the server, which indicate the accuracies of the predicted velocities along the x-axis, the y-axis, and the z-axis, t denotes the temperature prediction, and p denotes the pressure prediction.

Table 2 below illustrates model prediction metrics according to an embodiment of the present disclosure.

TABLE 2

| Inference time - GPU (for 80 × 10 × 150 grid data) | Less than 30 ms |
| Inference time - CPU (for 80 × 10 × 150 grid data) | 30 ms |
| Forward computation required for inference | Single forward propagation to generate complete output field |
| Model size | 590 MB |
| Training time | The time required for 1000 cycles of training is 15 minutes |

Compared with other methods, it can be determined from Tables 1 and 2 that the method implemented according to embodiments of the present disclosure can achieve more accurate predictions and shorter training time while also utilizing fewer training resources.

Figure 6:
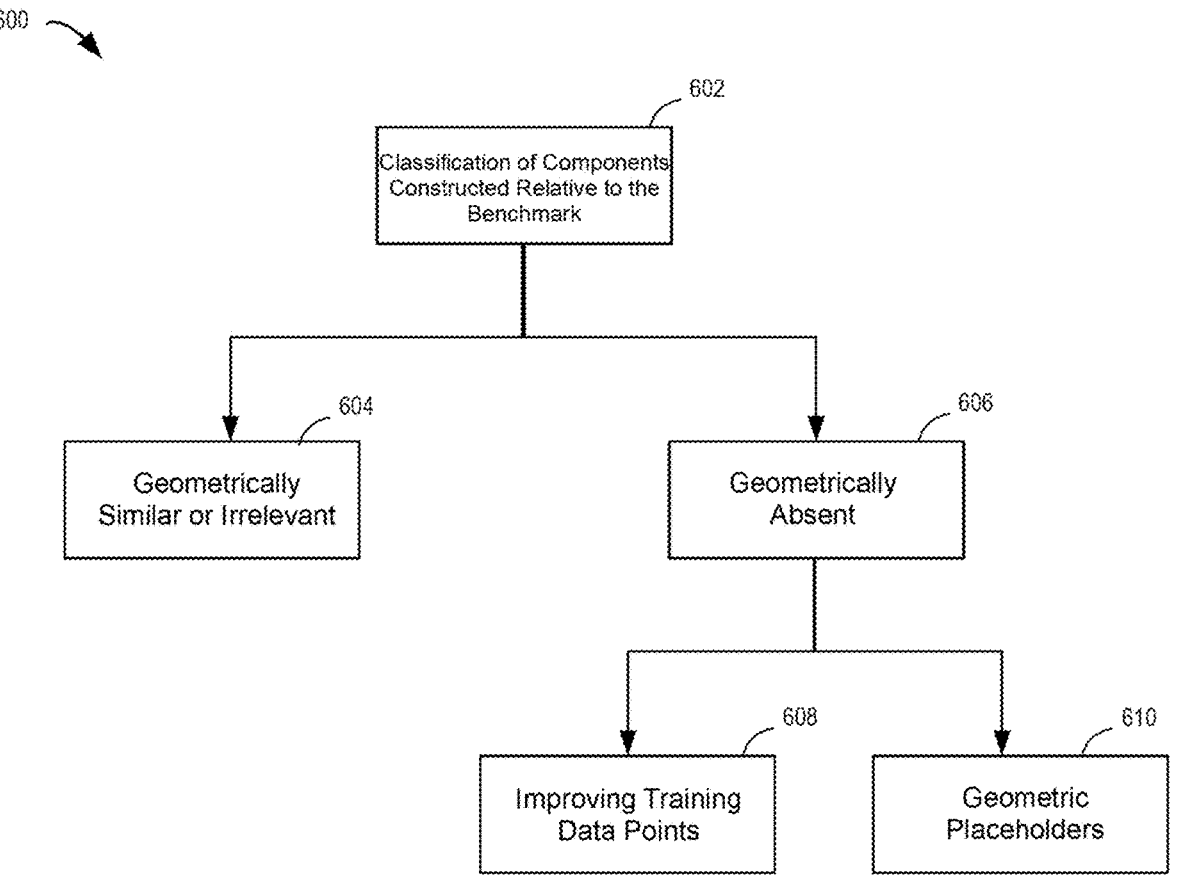
FIG. 6 is a schematic diagram of a process for another real-time thermal simulation method according to an embodiment of the present disclosure.

FIG. 6 is a schematic diagram of a process for another real-time thermal simulation method 600 according to an embodiment of the present disclosure. As shown in FIG. 6, at block 602, components in one or more target server chassis may be compared with a benchmark configuration as well as benchmark components at particular positions on the server chassis, and may be classified.

According to an embodiment of the present disclosure, characteristics of the benchmark configuration may first be determined, for example, the benchmark configuration may be the configuration with the highest performance or the most components. The benchmark configuration provides a criterion for comparison of different types of server chassis, and the configurations of all other types of server chassis can be evaluated on this basis. In some embodiments, the type, the number, the position, and the key characteristics, such as the size, the shape, the heat dissipation requirements, and the like, of each component of the benchmark configuration may be determined.

In some embodiments, performance data collected for each component may also be determined, for example, data on power consumption, heat output, heat dissipation requirements, and the like. In some embodiments, airflow and temperature distribution models under the benchmark configuration may also be established by using CFD simulated data.

Elements in the current target configuration can then be compared with elements in the benchmark configuration. For example, the components in the current target configuration can be compared with the components in the benchmark configuration to determine whether they are of the same model or different models. In some embodiments, the geometric sizes of the components in the two configurations that are determined to match may also be compared to determine if the two are geometrically similar. In some embodiments, the power consumption profiles of the components in the two configurations may also be compared to determine whether they are capable of generating similar amounts of heat under similar loads.

According to the result of the comparison, the difference between the configurations can be classified. For example, at block 604, according to the result of the comparison, the target configuration may be classified as components that are geometrically similar relative to the benchmark configuration or that do not require CFD remeshing. According to an embodiment of the present disclosure, if the target server configuration, relative to the benchmark server configuration, is the same in terms of the number of CPUs or components but different in terms of the model, while the geometries of these components are similar or consistent, the target configuration may be classified into this class.

For example, in some embodiments, if the components and shape of the target server are within a predetermined tolerance threshold or a predetermined threshold range of the benchmark configuration, the target configuration may be classified as components that are geometrically similar relative to the benchmark configuration or that do not require CFD remeshing. In some embodiments, even if the components of the target server differ from the benchmark configuration in terms of size and shape, but are functionally equivalent, the target configuration may also be classified as components that are geometrically similar relative to the benchmark configuration or that do not require CFD remeshing.

In some embodiments, when the output and cooling requirements of the target server are within a predetermined tolerance threshold or a predetermined threshold range of the benchmark configuration, the target configuration may be classified as components that are geometrically similar relative to the benchmark configuration or that do not require CFD remeshing. According to an embodiment of the present disclosure, these differences can be accommodated by scaling the existing power-load profile based on the benchmark configuration without additional inputs.

At block 606, according to the result of the comparison, the target configuration may be classified as components that are geometrically absent relative to the benchmark configuration or that may require CFD potential remeshing. Under this class, the target server is geometrically different relative to the benchmark configuration in terms of the number of components or in terms of components at the same location. For example, the target server has two CPUs while the benchmark configuration has only one CPU. In this case, not only the power or load profile of the component may change, but the component is not present, and therefore the simulated flow field may be affected.

For example, in some embodiments, if one or more components in the target server configuration and one or more components in the benchmark server configuration have a geometric similarity outside a predetermined threshold or have different numbers of components, the one or more components in the target server configuration may be classified as geometrically absent components.

According to an embodiment of the present disclosure, in order to address these issues, at block 608, an additional CFD simulation may be performed to capture differences in airflow due to one or more missing components, for example, at critical heat source components such as CPUs. For example, the benchmark model can be retrained by means of removing components from the geometric model of the benchmark configuration, adjusting and modifying boundary conditions and material properties, and other approaches, and the results of the simulation of the absent components can be compared to the results of the controlled simulation of the benchmark model, thereby identifying the main changes in the airflow and temperature distributions and verifying the accuracy of the CFD simulation.

At block 610, geometric or physical placeholders can be introduced between different configurations to replace the absent components, thereby maintaining the consistency of the flow field. For example, in some embodiments, for a situation where the number of components, such as hard disks, is highly variable, the use of geometric placeholders can avoid costly additional simulations. For example, for a component with flat power/load profiles and little variation in thermal output, such as an HDD in a front-end chassis, placeholders may be included as fixed structural portions, where part of the placeholders may be part of the server chassis, so as to facilitate mounting of the component. This can not only maintain the design continuity of the airflow, but also facilitate possible future component mounting and maintenance work, while simplifying the complexity of thermal management and CFD simulation.

In some embodiments, for some specific types of components, even if there exist geometric differences between different configurations, these differences may be ignored. In some embodiments, for example, components such as CPUs are thin in geometry so that they do not significantly alter the airflow pattern within the server. Since thin components such as CPUs (except for the heat that they generate) have a small cross-section in the direction perpendicular to the airflow, they have a smaller impact on aerodynamic characteristics compared with larger or protruding components.

Thus, even if there are differences in such components between different server configurations, these differences are usually not sufficient to cause significant changes in airflow patterns. Therefore, CPUs can be considered as geometrically similar, which allows simplifying the model to optimize the design process and reduce the computational complexity, thus making the simulation process more efficient. It should be noted that although in some embodiments, CPUs can be considered geometrically similar, variations in the amount of heat they generate still need to be taken into account in the simulations. This is because CPU heat generation is an important factor that affects the temperature distribution inside the server, and its heat can affect the cooling efficiency of the fans and the thermal states of other components.

In some embodiments, an estimated additional 1% error may also be introduced, so that the degree of generalization may be increased based on the selected trade-off, thereby ensuring model accuracy across server configurations. In some embodiments, when deploying the server using data from built-in thermal sensors, a model calibration process may be applied.

Figure 7:
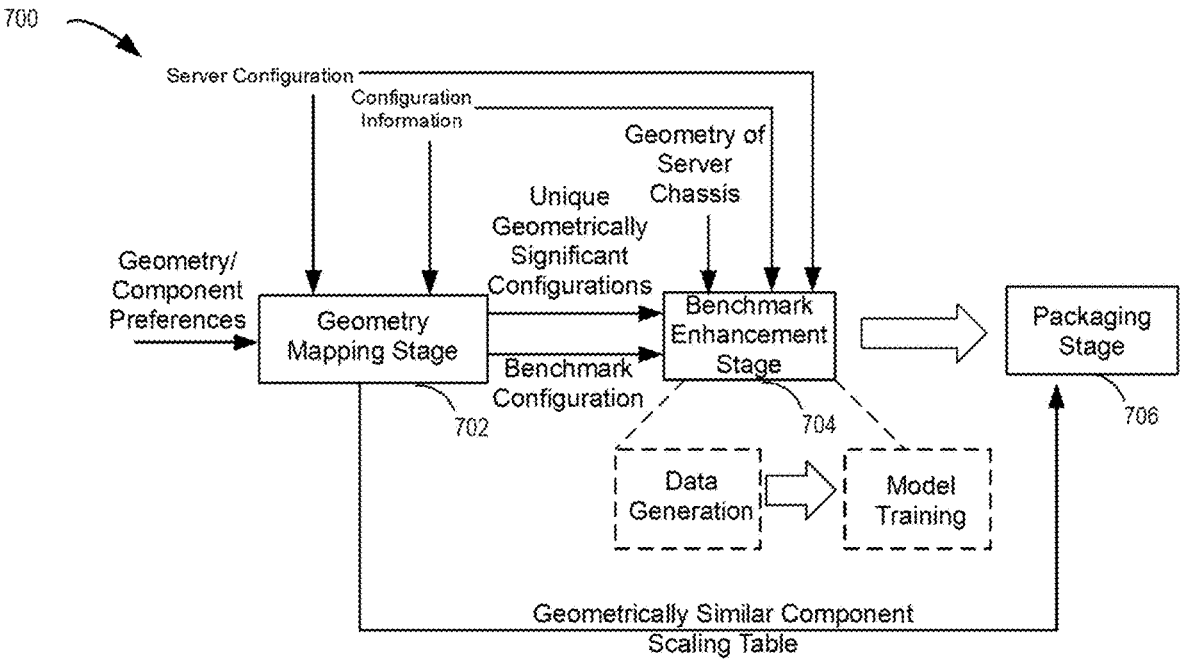
FIG. 7 is a schematic diagram of a further detailed process for a real-time thermal simulation method according to an embodiment of the present disclosure.

FIG. 7 is a schematic diagram of a further detailed process for a real-time thermal simulation method 700 according to an embodiment of the present disclosure. As shown in FIG. 7, at the geometry mapping stage at block 702, detailed information about all key hardware components (components such as CPUs, fans, HDDs, and so forth) in the server can be input.

In some embodiments, the detailed information may include key characteristics of a component such as the geometric model and the thermal characteristics (such as the load and power profile of the component as it is operating). Such information can establish key data points for the basis of the model, and they can influence the accuracy of CFD simulation results.

In some embodiments, server configuration information may also be input during the geometry mapping stage. The server configuration information can be used to define the operating environment and performance capabilities of the server and its performance on specific tasks. The server configurations can all be considered to be lists or tables of configurations for specific components and specifications, for example, lists such as "CPU #1, Model X, CPU #2," "Model is empty, HDD #1 Model A," or the like. In some embodiments, it may also include the number of cores of the CPU, the number of threads, the RAM capacity, the type and capacity of the motherboard, the power supply (the wattage and the power efficiency of the power supply), cooling system information (e.g., the number and size of fans, the water cooling system), the network configuration, and other information of the server.

In some embodiments, the geometry and component preferences of a user may also be input at the geometry mapping stage. According to an embodiment of the present disclosure, the user may set rules based on practical requirements and design goals, where these rules determine which components within the server can be considered geometrically similar and which can be ignored in terms of geometrical factors when evaluating the internal components of the server.

In some embodiments, these preferences may be set to simplify the process of CFD simulation, thereby reducing the complexity and computational requirements of the simulation while maintaining the accuracy of the results. For example, the user can specify that different models of hard disk drives are considered geometrically similar, or that a particular CPU model is geometrically ignorable.

For example, when two or more components are sufficiently close in geometry, size, mounting position, cooling requirements, among other things, they may be considered "geometrically similar" or geometrically alike, and the user may not be required to perform detailed CFD simulations for each unique component shape because the geometrical characteristics of these components are equivalent in terms of their impact on airflow or heat transfer. Specifically, in some embodiments, for example, if HDD model A and model B are similar in terms of the dimensions, the position of heat dissipation holes, and so forth, the system user may set them to be geometrically similar, which means that they can be used interchangeably in simulations without significantly affecting the simulation results.

Additionally or alternatively, in some embodiments, some components may be geometrically different from the other components, but since they have little effect on airflow or thermal distribution, these differences in them can be ignored in the simulation. For example, one kind of CPU chip may differ from other models in terms of its placement and size. However, these differences may not be sufficient to affect the airflow patterns or thermal load distribution inside the server, and thus that CPU chip may be classified as geometrically negligible.

In this embodiment, even if a different CPU model is used in the actual server configuration, the simulation can be performed without the need to finely model the geometric difference of that CPU, which eliminates the need to recreate an entirely new simulation environment for each small change, thereby saving costs and facilitating rapid iterative design and evaluation.

At the geometry mapping stage of block 702, a benchmark configuration can be output. For example, the thermal simulation system or the user may select as a benchmark the configuration that includes the most components and the highest heat generation/heat removal capabilities. According to an embodiment of the present disclosure, the configuration that includes the most components and functions is more easily generalizable to other configurations that include fewer components.

Additionally or alternatively, in some embodiments, the thermal simulation system or the user may also choose to output a list of unique geometrically significant configurations. For example, the list of unique geometrically significant configurations may include only configurations that are different from each other and relative to the benchmark in terms of geometric class/equivalence (they are geometrically dissimilar, their geometries are not negligible, and there are no placeholders). By using this list, it is possible to learn about the number of additional simulations required to capture different relevant configurations that may affect the airflow of the next stage. For example, if one or more components in the target server configuration and one or more components in the benchmark server configuration have a geometric similarity within a predetermined threshold or have the same number of components, the one or more components in the target server configuration are classified as geometrically similar components.

In some embodiments, the thermal simulation system or the user may also choose to output a geometrically similar component scaling table. The table is a matching table, where each component in the benchmark is compared with a geometrically similar component, and its scaling factor is calculated so that it can be adjusted accordingly when the simulation is performed. The scaling factor can be determined by comparing the power consumptions of a component at different loads, thus establishing equivalence of power consumption between different configurations.

With the scaling factor, a correlation between the benchmark and other component load/power profiles can be determined. For example, in some embodiments, the CPU benchmark has a power consumption of 150 W at a load of 50%, while the alternative CPU Y has a power consumption of 150 W at a load of 100%, and thus the CPU Y with a load of 100% may be considered to be the CPU X with a load of 50%.

The benchmark enhancement stage of block 704 may be performed with reference to the thermal emulation process described in FIG. 3. According to an embodiment of the present disclosure, in the data generation sub-stage, not only may the benchmark CFD simulation results be generated, but the results that are defined to cover potential changes in the airflow may also be generated.

In some embodiments, during the model training sub-stage, new inputs may also be added to the model to reflect an airflow simulation alternative scheme. Accordingly, three sets of new model inputs can be determined, such as heat generation sources (e.g., different models of CPUs may generate different amounts of heat), heat dissipation sources (e.g., different speeds of fans or different types of heat sinks), and geometrically significant configurations (e.g., different server layouts or components absent). At the end of the benchmark enhancement stage, a CFD machine learning model can be generated that accounts for different heat and cooling sources and different geometrically significant configurations, thus addressing geometrically non-existent considerations.

At the packaging stage of block 706, packaging for scaling/calibration of geometrically similar components may be performed. At this stage, a scaling packager can be added to the model input to perform calibrations according to the benchmark values. According to the inference model, it can intercept heat source, cooling source, and server configuration inputs and map them to scale-geometrically similar components and obtain a unique geometrically significant configuration belonging to that server configuration.

Figure 8:
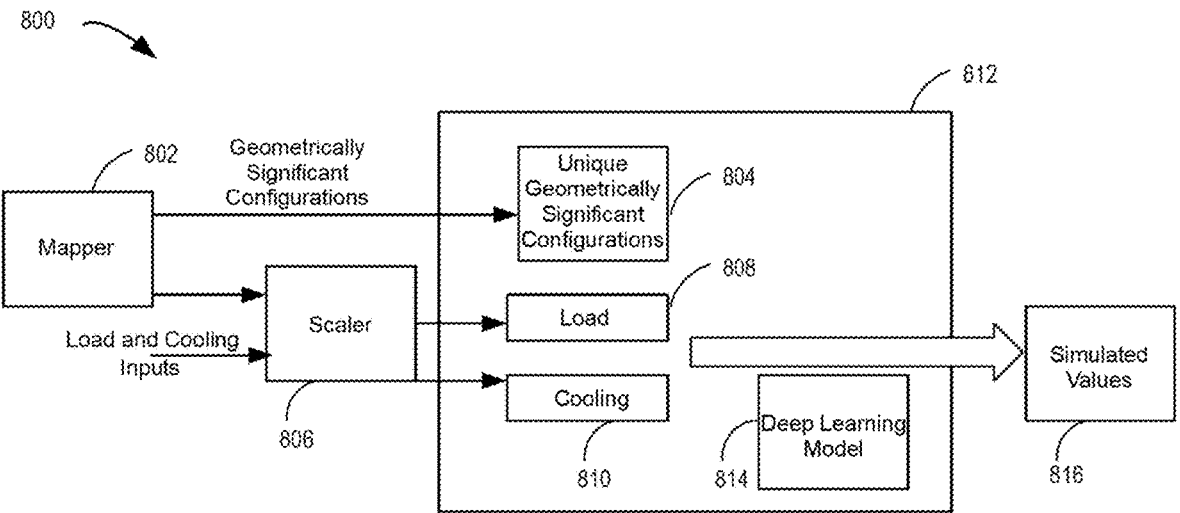
FIG. 8 is a schematic diagram of another detailed process for a real-time thermal simulation method according to an embodiment of the present disclosure.

FIG. 8 is a schematic diagram of another detailed process for a real-time thermal simulation method 800 according to an embodiment of the present disclosure. As shown in FIG. 8, the thermal simulation system may first receive specific configuration information of the server, and input parameters related to heat generation and heat removal (load situations of the components in the server and their cooling requirements), among others.

Then, a mapper 802 may determine which server configurations are geometrically significantly different from the benchmark configuration, identify geometrically similar components, and output a list of unique geometrically significant configurations 804. In some embodiments, a scaler 806 may perform appropriate scaling processing on input parameters of geometrically similar components according to a comparison with corresponding components in the benchmark configuration, thereby determining corresponding component loads 808 and cooling values 810.

A packager 812 may then determine actual simulated values 816, for example, information such as the temperature, the gas flow rate, the pressure, and so forth, for a specific server configuration based on the list of unique geometrically significant configurations 804, the component loads 808, and the cooling values 810 by means of a deep learning model 814. For example, in some embodiments, if the benchmark CPU on slot 1 is CPU model X, a simulation of the configuration of CPU model Y is being performed, and there is a load/power comparison profile for CPUs X and Y, the packager 812 may convert the value of the load CPU Y to be equal to the power of CPU X.

Figure 9:
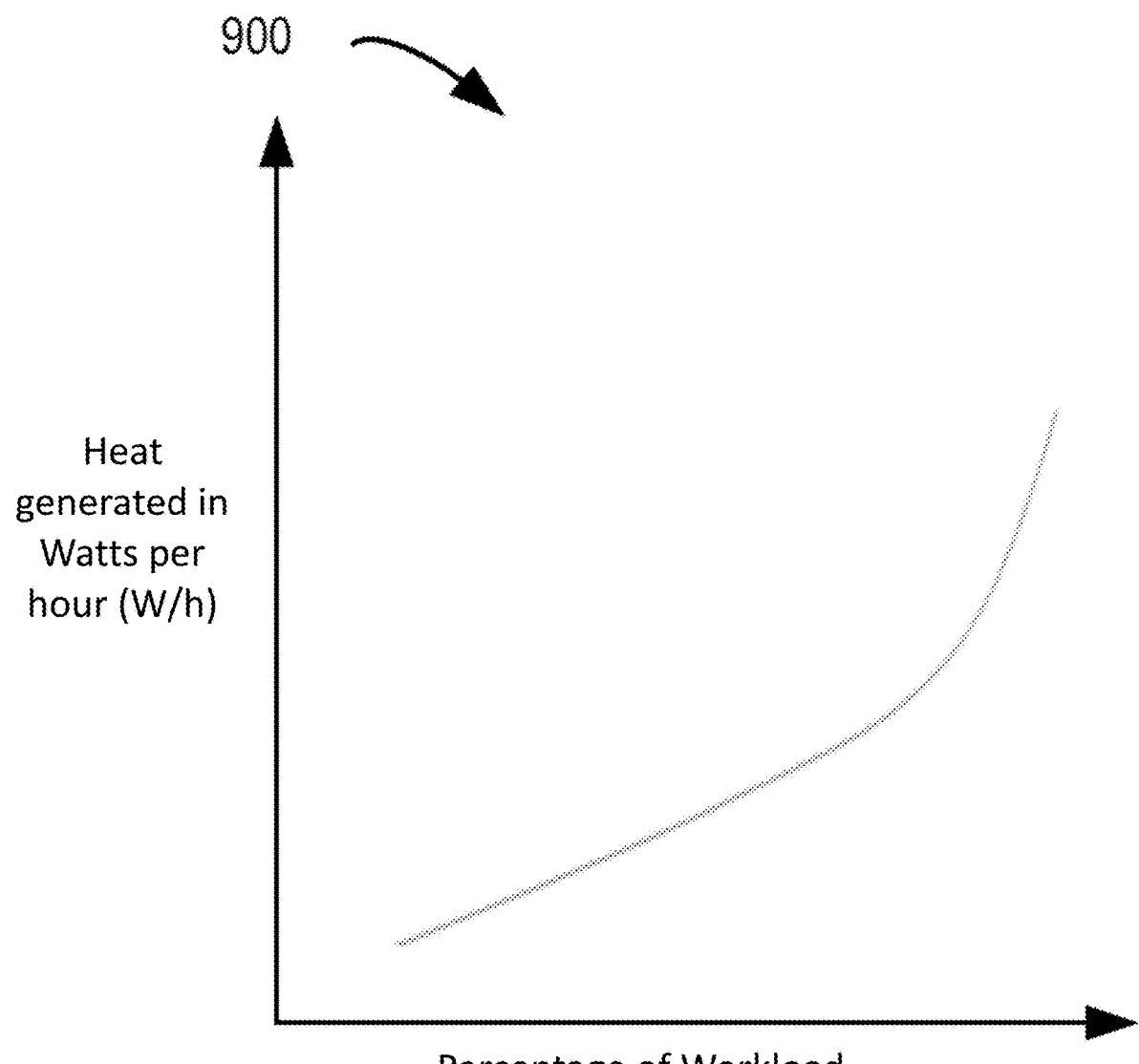
FIG. 9 is a schematic diagram of heat generated by a component under different workloads.

FIG. 9 is a schematic diagram of heat 900 generated by a component under different workloads. As shown in FIG. 9, the horizontal axis represents the percentage of workload, and the vertical axis represents the amount of heat generated in Watts per hour (W/h). As the CPU workload increases, the amount of heat it produces also increases. This increase is not linear. At lower workloads, the heat increase is relatively slow; however, when the workload exceeds a certain numerical point, the heat can increase faster, which means that the CPU becomes less efficient at high loads and generates more heat. As a result, additional cooling measures need to be taken when running high-load tasks for a long period of time so that the temperature of the server components are maintained within a safe range.

Figure 10:
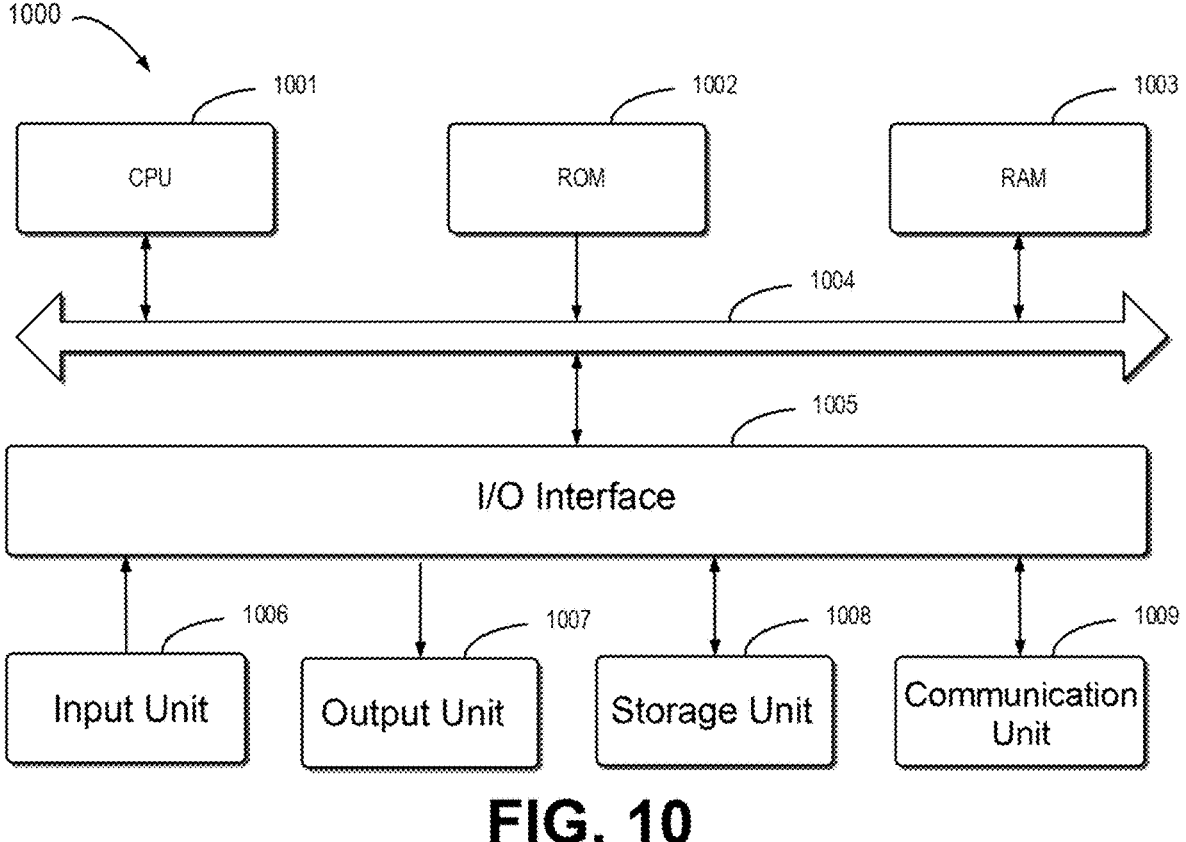
FIG. 10 is a block diagram of an example device that can be used to implement embodiments of the present disclosure.

FIG. 10 is a block diagram of an example device 1000 that can be used to implement embodiments of the present disclosure. As shown in the figure, the device 1000 includes a central processing unit (CPU) 1001 that may execute various appropriate actions and processing according to computer program instructions stored in a read-only memory (ROM) 1002 or computer program instructions loaded from a storage unit 1008 to a random access memory (RAM) 1003. Various programs and data required for the operation of the device 1000 may also be stored in the RAM 1003. The CPU 1001, the ROM 1002, and the RAM 1003 are connected to each other through a bus 1004. An input/output (I/O) interface 1005 is also connected to the bus 1004.

A plurality of components in the device 1000 are connected to the I/O interface 1005, including: an input unit 1006, such as a keyboard and a mouse; an output unit 1007, such as various types of displays and speakers; the storage unit 1008, such as a magnetic disk and an optical disc; and a communication unit 1009, such as a network card, a modem, and a wireless communication transceiver. The communication unit 1009 allows the device 1000 to exchange information/data with other devices via a computer network, such as the Internet, and/or various telecommunication networks.

The various processes and processing procedures described above, such as the method 200, may be performed by the CPU 1001. For example, in some embodiments, the method 200 may be implemented as a computer software program that is tangibly included in a machine-readable medium, such as the storage unit 1008. In some embodiments, part or all of the computer program may be loaded and/or installed onto the device 1000 via the ROM 1002 and/or the communication unit 1009. When the computer program is loaded into RAM 1003 and executed by CPU 1001, one or more actions of method 200 described above may be implemented.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

Computer program instructions for performing the operations of the present disclosure may be assembly instructions, Instruction Set Architecture (ISA) instructions, machine instructions, machine-related instructions, microcode, firmware instructions, state setting data, or source code or object code written in any combination of one or more programming languages, including object-oriented programming languages such as Smalltalk and C++, and conventional procedural programming languages such as "C" language or the like. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by using status information of the computer-readable program instructions. The electronic circuit may execute the computer-readable program instructions so as to implement various aspects of the present disclosure.

Various aspects of the present disclosure are described herein with reference to flowcharts and/or block diagrams of the method, apparatus (system), and computer program product according to embodiments of the present disclosure. It should be understood that each block of the flowcharts and/or the block diagrams and combinations of blocks in the flowcharts and/or the block diagrams may be implemented by the computer-readable program instructions.

These computer-readable program instructions may be provided to a processing unit of a general-purpose computer, a special-purpose computer, or other programmable data processing apparatuses to produce a machine, such that these instructions, when executed by the processing unit of the computer or other programmable data processing apparatuses, produce means for implementing the functions/acts specified in one or more blocks in the flowcharts and/or block diagrams. These computer-readable program instructions may also be stored in a computer-readable storage medium, and cause a computer, a programmable data processing apparatus, and/or other devices to function in a particular manner, so that the computer-readable medium having the instructions stored thereon includes an article of manufacture including instructions for implementing various aspects of the functions/acts specified in one or more blocks in the flowcharts and/or block diagrams.

The computer-readable program instructions may also be loaded onto a computer, other programmable data processing apparatuses, or other devices, such that a series of operational steps are performed on the computer, other programmable data processing apparatuses, or other devices to produce a computer-implemented process, such that the instructions executed on the computer, other programmable data processing apparatuses, or other devices implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on the involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated technical improvements, so as to enable persons of ordinary skill in the art to understand the embodiments disclosed herein.

What is claimed is:

1. A method, comprising:
    determining, by a trained machine learning model, benchmark computational fluid dynamics (CFD) for a benchmark server;
    determining a difference between a target server configuration for a target server and a benchmark server configuration for the benchmark server; and
    determining, by the trained machine learning model, target CFD for the target server based on the difference and the benchmark CFD;
    wherein determining the difference between the target server configuration and the benchmark server configuration comprises determining (i) geometric similarity between one or more components in the target server configuration and one or more components in the benchmark server configuration and (ii) geometric absence of one or more additional components in the target server configuration from the benchmark server configuration; and
    wherein the trained machine learning model determines the target CFD for the target server based on at least the determined geometric similarity between the target server configuration and benchmark server configuration and the determined geometric absence of the one or more additional components.

2. The method according to claim 1, wherein determining the difference between the target server configuration and the benchmark server configuration comprises:
    classifying the target server configuration based on the benchmark server configuration, wherein:
    classifying one or more components in the target server configuration as geometrically similar components in response to the one or more components in the target server configuration and one or more components in the benchmark server configuration having a geometric similarity within a predetermined threshold or having the same number of components; and
    classifying the one or more components in the target server configuration as geometrically absent components in response to the one or more components in the target server configuration and the one or more components in the benchmark server configuration having a geometric similarity outside the predetermined threshold or having different numbers of components.

3. The method according to claim 2, wherein determining, by the trained machine learning model, the target CFD for the target server based on the difference and the benchmark CFD comprises:
    determining the target CFD for the target server by scaling the benchmark CFD for the benchmark server in response to the one or more components in the target server configuration being the geometrically similar components.

4. The method according to claim 2, wherein determining, by the trained machine learning model, the target CFD for the target server based on the difference and the benchmark CFD further comprises:
    in response to the one or more components in the target server configuration being the geometrically absent components, performing one or more of:
    retraining the trained machine learning model based on data associated with the geometrically absent components;
    using physical placeholders to replace the geometrically absent components; and
    ignoring the geometrically absent components.

5. The method according to claim 4, further comprising:
    setting a table of unique geometrically significant configurations for the target server, wherein components in the table of unique geometrically significant configurations are geometrically dissimilar relative to components in the benchmark server and do not have the physical placeholders.

6. The method according to claim 4, wherein training the machine learning model comprises:
    collecting load data and cooling data associated with operation of the benchmark server; and
    training the machine learning model based on the load data, the cooling data, and a user predetermined condition.

7. The method according to claim 6, wherein the machine learning model is based on a deep learning model, and has a normalization layer and is adjusted based on the target server configuration.

8. The method according to claim 1, wherein the benchmark server configuration comprises component information associated with the benchmark server, and user-defined geometry and component preferences.

9. The method according to claim 1, wherein determining, by the trained machine learning model, the target CFD for the target server based on the difference and the benchmark CFD further comprises:

increasing a degree of generalization of the CFD for the target server by introducing an additional error.

10. An electronic device, comprising:

at least one processor; and memory coupled to the at least one processor and having instructions stored therein which, when executed by the at least one processor, cause the electronic device to perform actions comprising:

determining, by a trained machine learning model, benchmark computational fluid dynamics (CFD) for a benchmark server;

determining a difference between a target server configuration for a target server and a benchmark server configuration for the benchmark server; and determining, by the trained machine learning model, target CFD for the target server based on the difference and the benchmark CFD;

wherein determining the difference between the target server configuration and the benchmark server configuration comprises determining (i) geometric similarity between one or more components in the target server configuration and one or more components in the benchmark server configuration and (ii) geometric absence of one or more additional components in the target server configuration from the benchmark server configuration; and wherein the trained machine learning model determines the target CFD for the target server based on at least the determined geometric similarity between the target server configuration and benchmark server configuration and the determined geometric absence of the one or more additional components.

11. The electronic device according to claim 10, wherein determining the difference between the target server configuration and the benchmark server configuration comprises:

classifying the target server configuration based on the benchmark server configuration, wherein:

classifying one or more components in the target server configuration as geometrically similar components in response to the one or more components in the target server configuration and one or more components in the benchmark server configuration having a geometric similarity within a predetermined threshold or having the same number of components; and classifying the one or more components in the target server configuration as geometrically absent components in response to the one or more components in the target server configuration and the one or more components in the benchmark server configuration having a geometric similarity outside the predetermined threshold or having different numbers of components.

12. The electronic device according to claim 11, wherein determining, by the trained machine learning model, the target CFD for the target server based on the difference and the benchmark CFD comprises:

determining the target CFD for the target server by scaling the benchmark CFD for the benchmark server in response to the one or more components in the target server configuration being the geometrically similar components.

13. The electronic device according to claim 11, wherein determining, by the trained machine learning model, the target CFD for the target server based on the difference and the benchmark CFD further comprises:

in response to the one or more components in the target server configuration being the geometrically absent components, performing one or more of:

retraining the trained machine learning model based on data associated with the geometrically absent components;

using physical placeholders to replace the geometrically absent components; and ignoring the geometrically absent components.

14. The electronic device according to claim 13, further comprising:

setting a table of unique geometrically significant configurations for the target server, wherein components in the table of unique geometrically significant configurations are geometrically dissimilar relative to components in the benchmark server and do not have the physical placeholders.

15. The electronic device according to claim 13, wherein training the machine learning model comprises:

collecting load data and cooling data associated with operation of the benchmark server; and training the machine learning model based on the load data, the cooling data, and a user predetermined condition.

16. The electronic device according to claim 15, wherein the machine learning model is based on a deep learning model, and has a normalization layer and is adjusted based on the target server configuration.

17. The electronic device according to claim 10, wherein the benchmark server configuration comprises component information associated with the benchmark server, and user-defined geometry and component preferences.

18. The electronic device according to claim 10, wherein determining, by the trained machine learning model, the target CFD for the target server based on the difference and the benchmark CFD further comprises:

increasing a degree of generalization of the CFD for the target server by introducing an additional error.

19. A computer program product tangibly stored on a non-transitory computer-readable storage medium and comprising machine-executable instructions, wherein the machine-executable instructions, when executed by a machine, cause the machine to perform actions comprising:

determining, by a trained machine learning model, benchmark computational fluid dynamics (CFD) for a benchmark server;

determining a difference between a target server configuration for a target server and a benchmark server configuration for the benchmark server; and determining, by the trained machine learning model, target CFD for the target server based on the difference and the benchmark CFD;

wherein determining the difference between the target server configuration and the benchmark server configuration comprises determining (i) geometric similarity between one or more components in the target server configuration and one or more components in the benchmark server configuration and (ii) geometric absence of one or more additional components in the target server configuration from the benchmark server configuration; and wherein the trained machine learning model determines the target CFD for the target server based on at least the determined geometric similarity between the target server configuration and benchmark server configuration and the determined geometric absence of the one or more additional components.

20. The computer program product according to claim 19, wherein determining the difference between the target server configuration and the benchmark server configuration comprises:

classifying the target server configuration based on the benchmark server configuration, wherein:

classifying one or more components in the target server configuration as geometrically similar components in response to the one or more components in the target server configuration and one or more components in the benchmark server configuration having a geometric similarity within a predetermined threshold or having the same number of components; and classifying the one or more components in the target server configuration as geometrically absent components in response to the one or more components in the target server configuration and the one or more components in the benchmark server configuration having a geometric similarity outside the predetermined threshold or having different numbers of components.

* * * * *